UNITED STATES PATENT OFFICE.

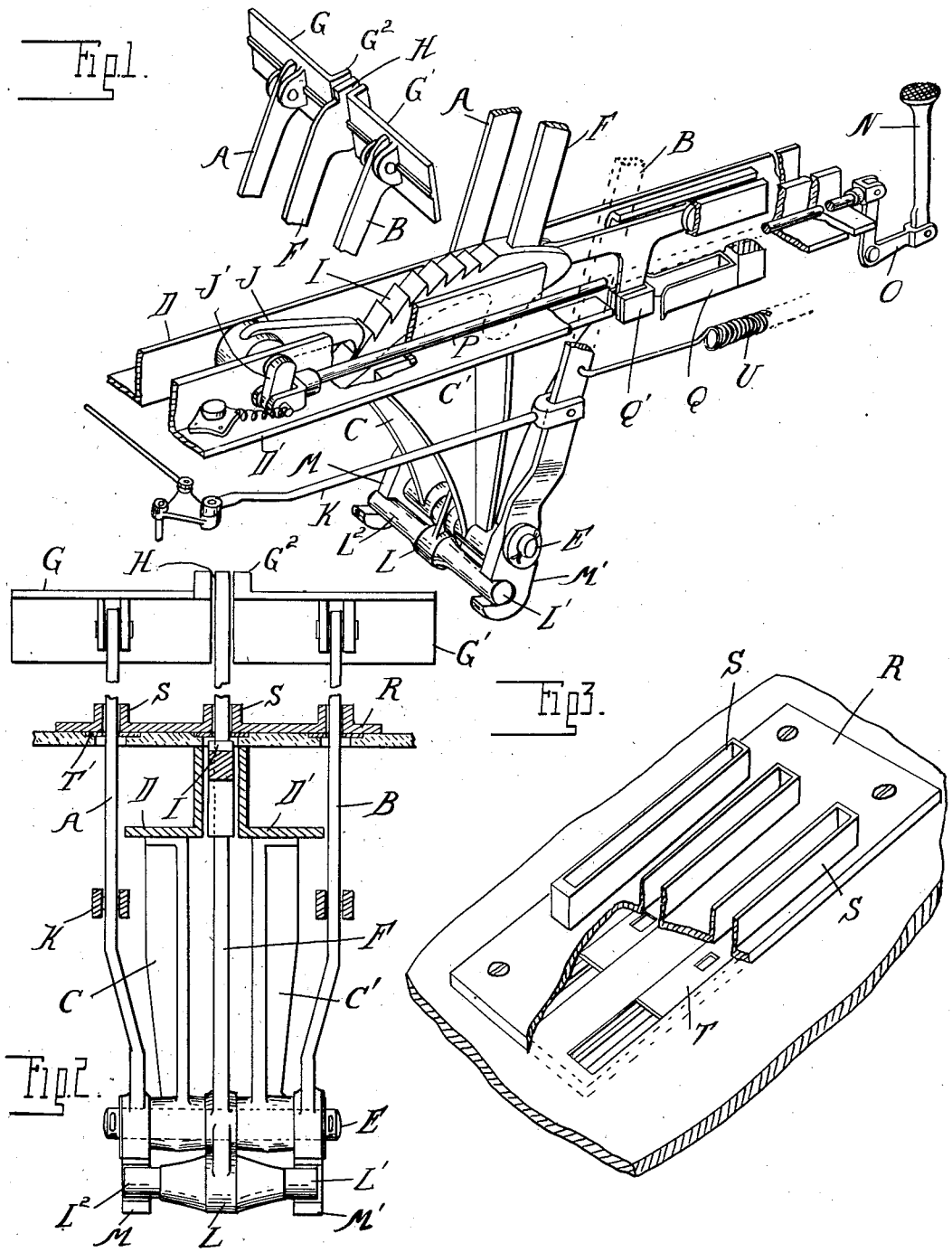

GEORGE M. BACON, OF DETROIT, MICHIGAN, ASSIGNOR TO ANDERSON ELECTRIC CAR COMPANY, OF DETROIT, MICHIGAN, A CORPORATION OF MICHIGAN.

CONTROL MECHANISM FOR MOTOR-VEHICLES.

1,104,161. Specification of Letters Patent. Patented July 21, 1914.

Application filed January 19, 1912. Serial No. 672,173.

*To all whom it may concern:*

Be it known that I, GEORGE M. BACON, a citizen of the United States of America, residing at Detroit, in the county of Wayne and State of Michigan, have invented certain new and useful Improvements in Control Mechanism for Motor-Vehicles, of which the following is a specification, reference being had therein to the accompanying drawings.

The invention relates to control mechanism for motor vehicles more particularly designed for use in controlling the brakes and the circuit opening switch of electric vehicles, and the invention consists in the peculiar construction, arrangement and combination of parts as hereinafter set forth.

In the drawings,—Figure 1 is a perspective view of the mechanism embodying my invention; Fig. 2 is a cross section thereof; and Fig. 3 is a perspective view of the plate.

A and B are two adjacent pedal levers for respectively controlling the main and the emergency brakes. These levers are fulcrumed upon a bracket bearing C depending from the frame D of the vehicle, which as shown, comprises two adjacent angle bars D, D' with support brackets C, C' secured thereto. The levers are arranged upon the outside of the brackets C and C' and are journaled or fulcrumed upon a pin or shaft E passing through the brackets. This shaft also forms the fulcrum for an intermediate lever F between the brackets and which passes upward between the angle bars D, D'.

G and G' are the foot rests or pedals proper for the levers A and B respectively and which are preferably provided on their inner sides with flanges $G^2$.

H is a bearing formed on the edge of the intermediate lever F and arranged between the flanges $G^2$ of the pedals G and G'.

I is a notched segment secured to the lever F between the bars D and D', and J is a hooked dog for engaging with said notched segment to hold the same in different positions of adjustment.

The levers A and B are connected by rods K with their respective brake mechanisms (not shown), and a lever F is arranged to cause the simultaneous movement of both of the levers A and B while permitting each to be independently operated. Thus as shown, L is an extension of the lever F below the fulcrum and which is provided with laterally extending pins L' and $L^2$ engaging notched bearings in downward extensions M and M' of the levers A and B. The arrangement is such that in the movement of the lever F the levers A and B are coupled thereto by the lateral extensions L and L' but when said lever F remains in its normal position either of the levers A and B may be operated independently of each other, and of the lever F. The dog J which engages with the notched segment I will prevent the return of the lever F and the levers A and B when actuated thereby. To release this lock a knob or button N which may be pressed by the foot is connected through the medium of a bell-crank lever O and rod P with an actuating rock arm J' for the dog J. Thus by pressing the button N the dog J is disengaged from the segment I and all of the levers are simultaneously released.

Q is a circuit opening switch, the movable blade Q' of which is connected with the lever F. In the normal position of this lever the switch Q is closed, but when the lever is actuated to cause the simultaneous operation of the pedal levers A and B the switch will be opened, which will cut-out the power from the vehicle.

The levers A, B and F preferably project upward through the foot-board of the vehicle body into convenient position for operation. This necessitates slots in said foot-board to permit the necessary movement of the levers and to avoid draft openings which would be formed by these slots. I preferably provide covering slides therefor.

As shown, R is a plate mounted on the foot-board of the vehicle and provided with slotted bearings S through which the levers pass. Between the plate R and the foot-board is a recess in which are arranged slides T engaging the respective levers and covering the openings in the slots. These slides will freely move during the adjustment of the levers and in each position will effectually close the slot openings so as to prevent draft therethrough. The bearings S preferably project upward above the surface of the plate R and permit of laying a carpet or other floor covering on the footboard adjacent thereof without interference with the levers.

In operation, the normal position of the levers will release the brakes and close the switch Q. The operator may then freely operate either one or both of the levers A and B independently of each other to apply the main or the emergency brake, and upon release of the pressure of the foot the levers will be automatically returned by suitable means such as the springs U. When however, it is desired to instantaneously operate both the brakes to obtain a sudden stoppage of the vehicle, by placing the foot over the central lever F, this as well as the levers A and B will be operated and the locking dog J engaging with the notched segment J' will hold the levers from return movement. Simultaneously with the movement of the levers the movable plate Q' of the switch Q will be adjusted to open said switch and cut-off power from the motor. The parts will remain locked in this position until the operator by pressing on the button N releases the dog J and permits the springs U to return the levers to normal position.

What I claim as my invention is:

1. In a control mechanism for electric vehicles, the combination with a plurality of independently operable brake pedal levers, of an intermediate lever arranged for simultaneous operation with both of said pedal levers when actuated by a single foot, and a circuit opening switch actuated by said intermediate lever.

2. In a control mechanism for electric vehicles, the combination with a pair of independently operable brake pedal levers and means for automatically retracting the same, of an intermediate lever operable simultaneously with said pedal levers, locking means for said levers automatically operated by said intermediate lever, and a circuit opening electric switch also actuated by said intermediate lever.

3. In a control mechanism for electric vehicles, the combination with a pair of independently operable pedal levers, and means for automatically retracting the same, of an intermediate lever operable simultaneously with said pedal levers when both are engaged by a single foot, locking mechanism for preventing the return of said levers operated by the intermediate lever, an electric switch connected to be opened by said intermediate lever when actuated, and releasing means for said locking means permitting the return of said levers.

In testimony whereof I affix my signature in presence of two witnesses.

GEORGE M. BACON.

Witnesses:
W. J. BELKNAP,
JAMES P. BARRY.